Dec. 12, 1967 R. H. VON STEIN 3,358,087

TELEPHONE INSTRUMENT DIALING CONTROL DEVICE

Filed May 21, 1964

Inventor
Robert H. Von Stein,
BY W. M. Kain
ATTORNEY

United States Patent Office 3,358,087
Patented Dec. 12, 1967

3,358,087
TELEPHONE INSTRUMENT DIALING CONTROL DEVICE

Robert H. Von Stein, Winston-Salem, N.C., assignor to Western Electric Company, Incorporated, New York, N.Y., a corporation of New York Filed May 21, 1964, Ser. No. 369,080
9 Claims. (Cl. 179—90)

ABSTRACT OF THE DISCLOSURE

A telephone instrument dialing control device for limiting to a predetermined number of digits which may be dialed on the instrument to preclude unauthorized use of the instrument for multi-digit dialing as utilized in long distance signalling.

This invention relates to a telephone instrument dialing control device and more particularly to a telephone instrument dialing control device for controlling the number of digits which may be dialed on the instrument.

The term "digit" is here used in the broad sense and includes numerals and alphabet characters, as well as other symbols which may be represented on a telephone instrument dial. The term "dialing" or its derivatives is used in the broad sense and includes the transmission of signals, representative of digits, over telephone facilities in response to the actuation of a telephone dialing mechanism. This transmission of signals is also known as "signaling."

In many situations it is desired to control or limit the number of digits which may be dialed on a telephone instrument. For example, in a large office it is sometimes necessary to dial a first digit followed by the usual seven digit telephone number in order to complete a local call outside of the office. In such a situation, it may be desired to limit the operation of certain telephone instruments so that only up to seven digits may be dialed, thereby preventing unauthorized local calls, while permitting seven or less digit extension calls. In another example, it may be desired to preclude the direct distance dialing of long-distance calls (which presently requires the dialing of ten digits) while permitting the dialing of seven or less digit local calls. It is to be understood that the above examples are only illustrative of many such situations and are not to be construed as limiting the principles of the invention.

An object of this invention is to provide a new and improved telephone instrument dialing control device.

Another object is to provide a new telephone instrument dialing control device for controlling the number of digits which may be dialed on a telephone instrument. A related object is to provide such a dialing control device which can be incorporated into conventional telephone instruments with a minimum of modifications.

Another object is to provide a new telephone instrument dialing control device wherein the maximum number of digits which may be dialed by the instrument can be varied by a simple adjustment of the device.

Another object is to provide a new telephone instrument dialing control device which may be selectively rendered ineffective to control the conventional operation of a telephone instrument.

Another object is to provide a new telephone instrument dialing control device which renders the telephone instrument tamper resistant when the device is engaged to control dialing.

With these and other objects in view, a telephone instrument dialing control device illustrating certain features of the invention includes facilities which cooperate with the dialing mechanism of a telephone instrument to permit dialing mechanism to generate signals representative of digits up to a predetermined number of times and to prevent generation of such signals thereafter.

Other objects and advantages of the invention will become apparent by reference to the following detailed specifications and accompanying drawings, wherein.

Figure 1:
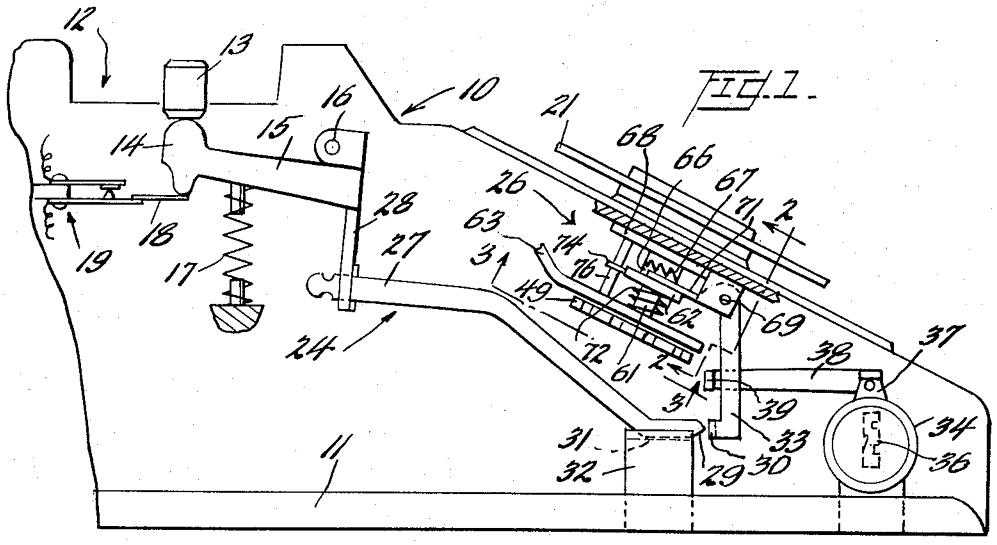
FIG. 1 is an open side view of a conventional telephone instrument diagrammatically showing certain of the elements thereof which cooperate with a telephone instrument dialing control device incorporating certain principles of the invention.

In FIG. 1, there is shown an outline of a housing 10 of a conventional telephone instrument. Only those parts of the instrument are shown which are necessary to describe the cooperation of the instrument with the dialing control device of the invention.

Housing 10 is mounted on a base 11 and has a cradle 12 for receiving a hand set (not shown). A plunger 13 slidably projects through the base of cradle 12. Plunger 13 engages a projection 14 of a switch arm 15 which is pivotally mounted about a shaft 16 secured to the base. Projection 14 is urged upwardly by spring 17 to the position shown in FIG. 1 when the hand set is removed from cradle 12. A switch actuator 18 is attached to the bottom of switch arm 15 and cooperates with the contacts of a switch 19 which is mounted on base 11. Switch 19 is located so that depression of plunger 13 causes switch actuator 18 to open the switch contacts, thereby disconnecting the telephone instrument from the telephone line.

Figure 2:
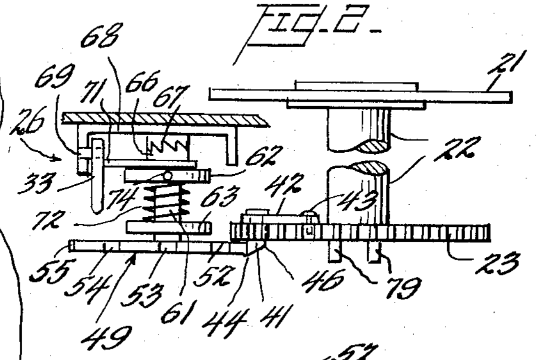
FIG. 2 is a view taken along line 2—2 of FIG. 1 showing the cooperation between the dialing mechanism of the telephone instrument and the dialing control device.

The conventional telephone instrument also includes a dialing mechanism comprising a rotary dial 21 secured to one end of a shaft 22 (FIG. 2). A drive gear 23 is secured to the other end of shaft 22. Shaft 22 is rotatably mounted on base 11. Dial 21 has the usual ten aperture positions representative of digits. It is to be understood that housing 10 is only a representative configuration of telephone instruments and that the elements of the telephone instrument above described are only schematically shown.

Referring to FIG. 1, a linkage 24 is coupled between switch arm 15 and the dialing control device, generally designated by reference numeral 26. Linkage 24 includes a slide bar 27 which is loosely connected to a depending arm 28 attached to switch arm 15. This loose connection permits the tip 29 of the slide bar to freely move laterally (as seen in FIG. 1) when switch arm 15 is pivoted about shaft 16. Tip 29 is guided in its lateral movement by a guide channel 31 formed in a block 32 secured to the base. Tip 29 is located opposite a lateral projection 30 of a reset arm 33 of the dialing control device 26.

A conventional lock mechanism 34 is secured to base 11 and includes a key mechanism 36 and a bracket 37 attacher thereto. An arm 38 extends from bracket 37 and has a hook or lip 39 (FIGS. 1 and 6 ) at the end thereof which is positioned to hook reset arm 33.

Figure 5:
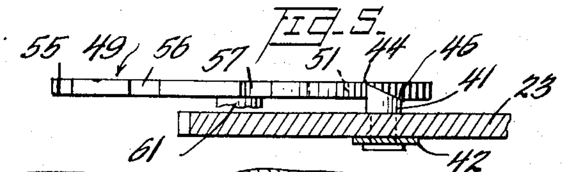
FIG. 5 is a detailed view taken on line 5—5 of FIG. 4 showing the drive gear precluded from further rotation by the program counter.

Referring to FIG. 2, a bevelled actuator pin 41 is secured to a resilient flat spring 42 which is staked or secured in any suitable manner to drive gear 23 at the end 43 opposite the actuator pin. As best seen in FIGS. 2 and 5, bevelled actuator pin 41 has a slanting end surface including a high portion 44 and a low portion 46. Dialing control device 26 includes a wheel or program counter 49 having a plurality of notches or indentations 51–57 (FIG. 3) equally-spaced apart about its periphery. Program counter 49 is secured on one end of shaft 61 on the other end of which is secured a plate 62. Shaft 61 is rotatably mounted in a bracket 63 which is secured in a suitable manner to base 11.

Referring to FIGS. 1 and 2, a ratchet-type mechanism includes a rotatable gear 66, which is secured to the end of plate 62, and a stationary gear 67, which is mounted on a bracket 68 suitably secured to base 11. Gears 66 and 67, when engaged, permit rotation of shaft 61, and therefore program counter 49, in one direction only (clockwise as viewed in FIG. 3).

Reset arm 33 is pivotally mounted about a shaft 69 which is mounted on bracket 68. Reset arm 33 has a horizontal extension 71 which engages plate 62. A spring 72 encompasses shaft 61 and is secured at its ends to plate 62 and to bracket 63. Plate 62 has a rod 74 extending therefrom which abuts a fixed post 76 (FIG. 1) when dialing control device 26 is in its initial position.

Figure 3:
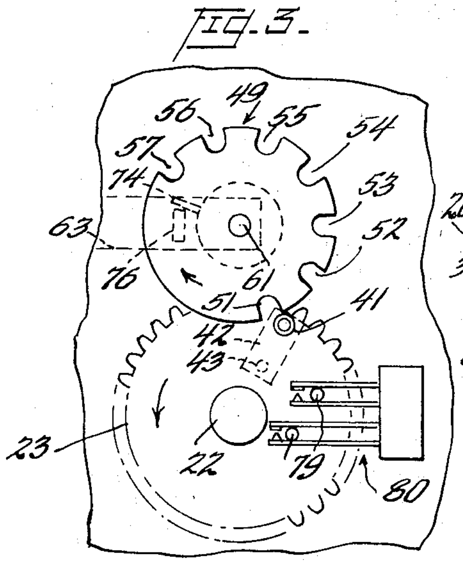
FIG. 3 is a bottom view taken along line 3—3 of FIG. 1 showing a program counter of the dialing control device cooperating with the drive gear of the dialing mechanism.

Referring to FIG. 3, drive gear 23 has a pair of conventional switch actuating pins 79 (FIG. 3) mounted thereon. The switch actuating pins are designed to actuate conventional signaling facilities 80, schematically shown, for generating pulses or signals indicative of a digit dialed on the dialing mechanism.

*Operation*

For illustrative purposes only, assume that it is desired to preclude the direct distance dialing of long-distance calls, which presently require the dialing of ten digits, but to permit the dialing of seven or less digit local or extension calls. In such a situation, program counter 49 would have seven notches 51–57 (FIG. 3).

Referring to FIGS. 1–3, assume that dialing control device 26 is in its initial position; that is, rod 74 abuts post 76, notch 51 of program counter 49 is opposite actuator pin 41 (FIG. 3), and lock mechanism 34 is in the position shown in FIG. 1.

When dial 21 is rotated to dial a first digit, drive gear 23 is rotated counterclockwise (as viewed in FIG. 3) to move actuator pin 41 into notch 51. As drive gear 23 is further rotated counterclockwise, actuator pin 41 engages and rotates program counter 49 clockwise a first increment, such that notch 52 now occupies the position formerly occupied by notch 51. Further counterclockwise rotation of drive gear 23 moves actuator pin 41 out of notch 51. During such rotation of drive gear 23, switch actuating pins 79 actuate the signaling facilities 80 to generate signals indicative of the digit dialed.

When dial 21 is released, conventional facilities (not shown) restore the dial and drive gear 23 to their initial position, that is the drive gear returns to the position shown in FIG. 3. During the restoration of the drive gear, actuator pin 41 moves back into notch 51. The low portion 46 of actuator pin 41 strikes the solid portion of program counter 49 between notches 51 and 52 and forces the depression of the actuator pin against resilient spring 42. Thus, actuator pin 41 slides under the solid portion of program counter 49 as drive gear 23 returns to its initial position. Program counter 49 remains in this advanced position since gears 66 and 67 are engaged, thus precluding the return of the program counter to its initial position (FIG. 3).

When dial 21 is rotated a second time to dial a second digit, drive gear 23 is again rotated counterclockwise (FIG. 3) and moves actuator pin 41 into notch 52. Further rotation of drive gear 23 rotates program counter 49 another increment. Notch 52 now occupies the advanced position formerly occupied by notch 51, and notch 53 now occupies the original position of notch 51. When dial 21 is again released, program counter 49 remains in this second advanced position and the conventional facilities again restore drive gear 23 to its initial position.

This dialing procedure continues in identical manner until dial 21 has been rotated seven times to dial seven digits. When the seventh digit has been dialed, program counter 49 and actuator pin 41 occupy the positions shown in FIG. 4, that is, the actuator pin is now opposite the solid portion of the program counter between notches 57 and 51. Since spring 72 is secured to bracket 63 and plate 62, the spring is wound up to establish torsional forces tending to restore the shaft.

Figure 4:
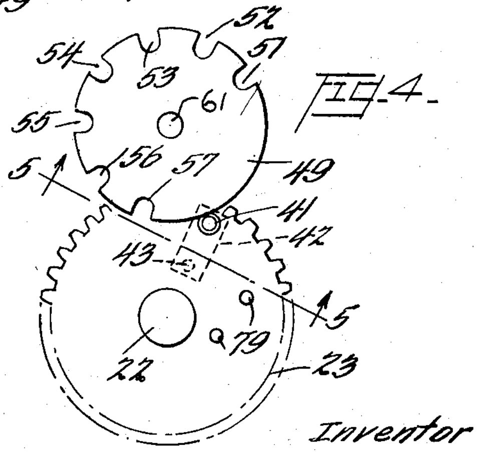
FIG. 4 shows the program counter and the drive gear of FIG. 3 after a maximum authorized number of digits has been dialed.

An attempt to rotate dial 21 an eighth time to dial an eighth digit will be futile. If such an attempt is made, drive gear 23 moves slightly to drive the high portion 44 of actuator pin 41 against the solid portion of program counter 49 between notches 57 and 51 (FIGS. 4 and 5). This prevents actuator pin 41 from being depressed against flat spring 42. Thus, dial 21 and drive gear 23 cannot be rotated, and no further digits can be dialed.

Resetting of dialing control device 26 to its initial position is simply accomplished by returning the handset to cradle 12 to depress plunger 13. Plunger 13 bears down on projection 14 to pivot switch arm 15 against the upward force of spring 17 (FIG. 1). Thus, tip 29 of linkage 24 pushes laterally against bar 30 to pivot reset arm 33 about shaft 69. This action causes extension 71 of reset arm 33 to bear upon and move plate 62 downward (FIG. 2). This movement of plate 62 downward compresses spring 72 such that program counter 49 is moved clear of the high portion 44 of actuator pin 41. This action also disengages gear 66 from gear 67, and permits spring 72 to unwind and thereby restore program counter 49 to its initial position (FIG. 3). Release of plunger 13 allows spring 72 to expand and to bear on plate 62, thereby forcing gears 66 and 67 back into engagement. Since program counter 49 is now in its initial position, another group of seven or less digits may be dialed. It will be understood that the dialing control device may be reset at any time by depressing plunger 13, either manually or by placing the handset in cradle 12. It should be noted that by the simple act of "hanging up" of handset, line switch 19 is opened to disconnect the instrument from the line and the control device 26 is reset.

Dial control device 26 may be rendered ineffective to control the dialing mechanism, thereby permitting ordinary operation of the telephone instrument. To accomplish this, a key is inserted into key mechanism 36 of lock 34 and rotated clockwise (FIG. 1). Bracket 37 rotates clockwise with the key mechanism and moves arm 38 to the right (FIG. 1). This action causes lip 39 to hook reset arm 33 and pivot the reset arm about shaft 69 and disengage gears 66 and 67. Program counter 49 is moved downwardly (FIG. 2) and held in a position such that the high portion 44 of actuator pin 41 does not contact the program counter upon rotation of drive gear 23.

Figure 6:
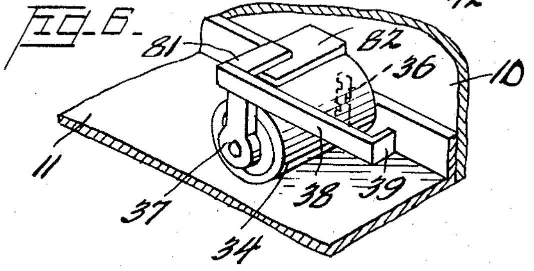
FIG. 6 is a perspective view diagrammatically showing a lock mechanism of the dialing control device being effective to render the telephone instrument tamper resistant when the control device is engaged to control dialing.

Referring to FIG. 6, bracket 37 has a lateral extension 81 attached thereto. Extension 81 is located slightly above a laterally extending tab 82 formed integrally with or secured in any suitable manner to housing 10. When key mechanism 36 is rotated clockwise (FIG. 1) bracket 37 rotates (clockwise FIG. 1, or counterclockwise FIG. 6) and moves extension 81 clear of tab 82. This permits housing 10 to be vertically lifted from base 1. When key mechanism 36 is in the position shown in FIGS. 1 and 6, the instrument is rendered tamper resistant since extension 81 and tab 82 are vertically aligned, thereby preventing removal of the housing from the base. In this manner, access cannot be gained to the dialing control device when the control device is engaged to control dialing (FIG. 1).

It will be apparent to one skilled in the telephone art that program counter 49 can be adjusted to permit any desired number of digits to be dialed. Instead of having seven notches 51–57 as illustratively shown in FIGS. 3 and 4, program counter 49 may have ten or more notches. Since the number of notches determines the number of times dial 21 may be rotated, plugs may be inserted into the notches beyond the authorized number of dialing times. For the illustrative example used in describing the operation of the dial control device, the eighth, ninth and tenth notches would be plugged.

Although the invention has been illustratively described with respect to a telephone instrument having a rotary-type dialing mechanism, it would be within the realm of ability of one skilled in the telephone instrument art to apply the principles of the invention to other types of telephone instruments, for example, instruments having push button-type dialing.

It is to be understood that the above-described embodiment is illustrative of the principles of the invention and many alternatives may be devised without departing from the scope of the invention.

What is claimed is:

1. In a telephone instrument, the combination of signal generating means for producing signals representing digits of a telephone number to be called, and means for permitting signals to be produced by the signal generating means up to a predetermined number of times only and means responsive to the production of said signals up to a predetermined number of times for preventing the production of such signals after the production of the predetermined number thereof.

2. In a telephone instrument, the combination of signaling means for generating signals representative of digits of a telephone number to be called, switch means for coupling the signaling means to a telephone line, means having an initial position for permitting the signals to be produced by the signaling means up to a predetermined number of times only and means responsive to the production of said signals up to a predetermined number of times for preventing the production of such signals after production of the predetermined number thereof, and means for opening the switch means to decouple the signaling means from the telephone line and for resetting the permitting and preventing means to the initial position.

3. In a telephone instrument including a dialing mechanism for generating signals representative of digits, the combination with said dialing mechanism of actuator means attached to the dialing mechanism for movement therewith, and program means engageable by the actuator means for permitting the actuation of the dialing mechanism up to a predetermined number of times only and for precluding such actuation of the dialing mechanism after the predetermined number of times.

4. In a telephone instrument including a dialing mechanism for generating signals representative of digits, the combination with said dialing mechanism of actuator means attached to the dialing mechanism for movement therewith, program means, having an initial position and engageable by the actuator means upon movement of the dialing mechanism, for permitting the actuation of the dialing mechanism up to a predetermined number of times only and for precluding such actuation of the dialing mechanism after the predetermined number of times, and means for resetting the program means to the initial position to permit reactuation of the dialing mechanism up to the maximum number of times.

5. In a telephone instrument including a dialing mechanism for generating signals representative of digits, the combination with said dialing mechanism of actuator means attached to the dialing mechanism for movement therewith, program means, having an initial position and engageable by the actuator means upon movement of the dialing mechanism, for permitting the actuation of the dialing mechanism up to a predetermined number of times only and for precluding such actuation of the dialing mechanism after the predetermined number of times, means for resetting the program means to the initial position to permit reactuation of the dialing mechanism up to the maximum number of times, and means for locking the resetting means to prevent the program means from affecting the actuation of the dialing mechanism, thereby permitting an unlimited number of actuations of the dialing mechanism.

6. In a telephone instrument including a housing; a base; and a signaling mechanism mounted thereon, the signaling mechanism having facilities for generating signals representative of digits, a rotatable dial attached to a drive gear, and facilities for permitting rotation of the dial and drive gear in one direction and for restoring the dial and drive gear to an initial position when the dial is released; the combination with said housing, base, and signaling mechanism of a program counter wheel rotatably mounted on the base, having an initial position and a plurality of notches spaced about the periphery of the wheel, the plurality of notches representing the maximum number of times the signaling mechanism may be actuated to generate signals, an actuator, resiliently attached to the drive gear for movement therewith, for sequentially engaging the notches to advance the counter wheel an increment upon each rotation of the dial, thereby permitting the generation of signals by the signaling mechanism upon each rotation of the dial up to the maximum number of times, and means coupled to the counter wheel for maintaining the counter wheel in an advanced position upon each rotation of the dial, further rotation of the dial being precluded after the actuator has engaged the last notch and advanced the counter wheel the last increment.

7. The combination as claimed in claim 6 and further comprising means for decoupling the maintaining means from the counter wheel and for resetting the counter wheel to the initial position.

8. The combination as claimed in claim 7 and further comprising a lock mechanism, mounted on the base and having an arm selectively coupled to the decoupling and resetting means for rendering the decoupling and resetting means effective to preclude the maintaining means from affecting the operation of the dialing mechanism, thereby permitting an unlimited number of actuations of the dialing mechanism.

9. The combination as claimed in claim 8 wherein the lock mechanism has a tab for engaging the housing to secure the base to the housing; thereby preventing the separation thereof when the maintaining means and counter wheel are coupled together.

References Cited

UNITED STATES PATENTS

| | | | |
|---|---|---|---|
| 2,216,850 | 10/1940 | Marti | 179—90 |
| 3,221,109 | 11/1965 | Day et al. | 179—27 |
| 3,284,578 | 11/1966 | Evans | 179—90 |

KATHLEEN H. CLAFFY, *Primary Examiner.*

A. H. GESS, *Assistant Examiner.*